UNITED STATES PATENT OFFICE.

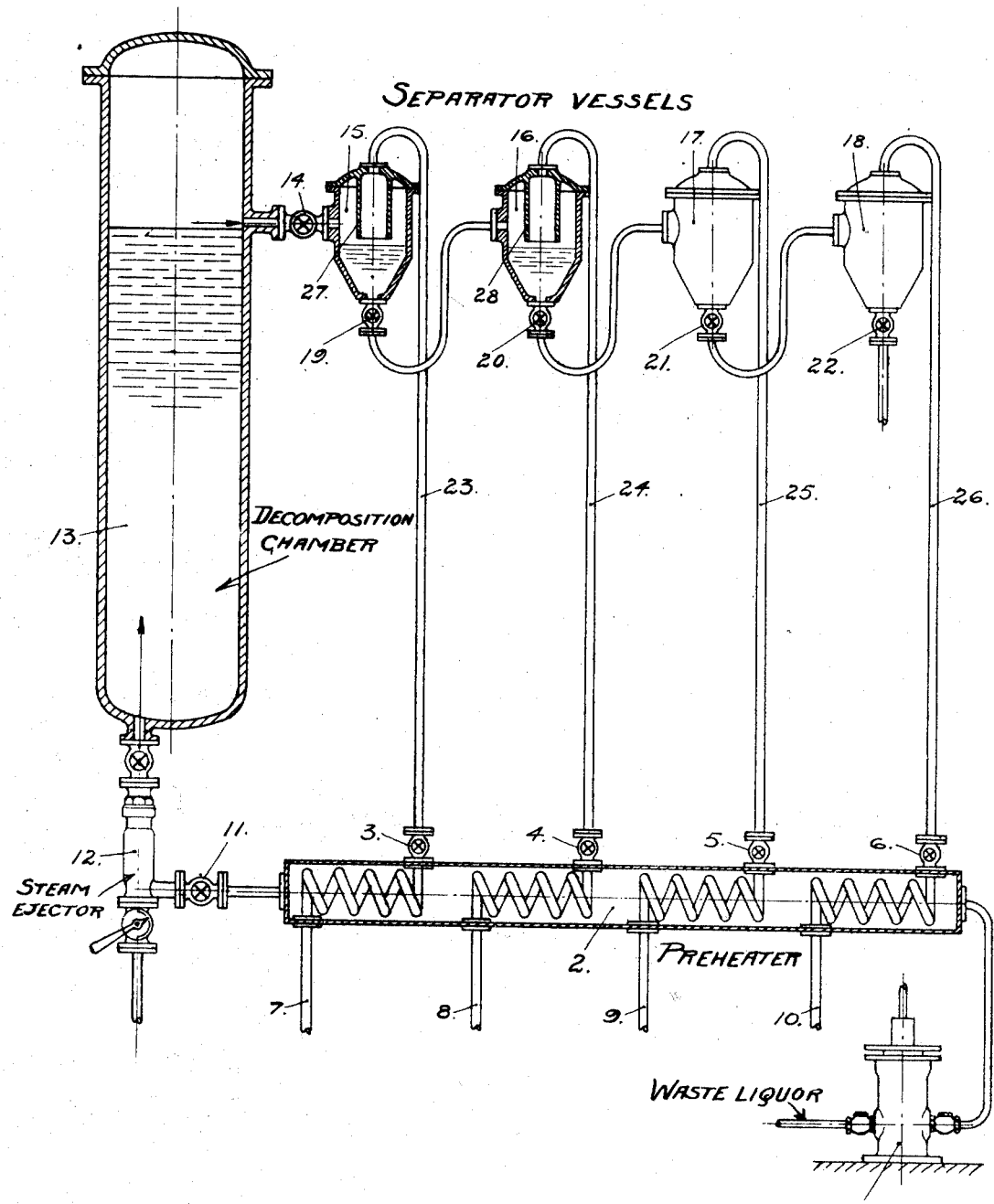

KRISTOFFER MÖRCH, OF CHRISTIANIA, NORWAY.

CONTINUOUS PROCESS OF DECOMPOSING WASTE SULPHITE LIQUOR.

1,415,843.

Specification of Letters Patent.

Patented May 9, 1922.

Application filed May 10, 1920. Serial No. 380,413.

*To all whom it may concern:*

Be it known that I, KRISTOFFER MÖRCH, a subject of the King of Norway, and a resident of Christiania, Kingdom of Norway, have invented certain new and useful Improvements in Continuous Processes of Decomposing Waste Sulphite Liquor, of which the following is a specification.

This invention relates to the decomposition of waste liquor from sulphite cellulose factories and has for its object a method whereby such decomposition may be carried out continuously.

My invention is based on the known fact that waste sulphite liquor when heated to a sufficiently high temperature under pressure is decomposed into $CaSO_4$ and organic substances of the lignin type. Such processes have, however, heretofore always been carried out intermittently and have consequently required comparatively large decomposing autoclaves and much time and labor in filling and emptying these. Further it has been found difficult to utilize the heat escaping in the form of steam and hot gases, which are blown off before the autoclaves are emptied.

According to my present invention such difficulties are avoided, and the waste liquor may enter my decomposing system continuously, the decomposition taking place as the liquor passes through the decomposing system, and the resulting products leaving the system continuously. In this manner no time is lost in filling and emptying the autoclaves and a comparatively small apparatus will have a great capacity.

I attain this result by leading the waste liquor first through a preheater, in which the temperature of the liquor by means of indirect or direct steam heating is brought up to the desired degree. From this preheater the hot liquor is by means of a pump or an injector continuously removed into a container which is kept under such high pressure that decomposition will immediately take place. The pressure in the container is kept constant and the solid substances formed together with the mother liquor and gases are continuously removed through an opening in the container and separated from each other by means of filtration or in other known manner.

On account of the high pressure in the container it is advantageous to provide its opening with a reduction valve or other means for gradually reducing the pressure.

It is obvious that the details of my process may vary within wide limits, but in the following specific example I will illustrate my process as preferably carried out, reference being had to the accompanying drawing forming part of this application. The drawing represents a side view of my decomposing system.

The waste liquor is preferably led directly from a sulphite digester through the pump 1 into the preheater 2, consisting of an iron cylinder with internal steam coils, the steam entering the coils through the valves 3, 4, 5, and 6, and leaving them at 7, 8, 9 and 10. The liquor leaves the preheater through a valve 11 at a temperature of approximately 170° C., and is mixed with direct steam and enters a lead lined iron container through a steam injector 12, which raises the temperature to approximately 200° C. Pressure is maintained in the container at about 17–20 kilograms per square centimeter. When entering this container the temperature and pressure of the liquor will be such as to cause a rapid decomposition. The products formed leave the container through a pressure regulating and outlet valve 14 and pass continuously into a pressure-reduction system, consisting of four lead-lined iron vessels 15, 16, 17 and 18. These are provided with suitable connections and valves 19, 20, 21 and 22, through which the solid and liquid decomposition products may pass consecutively through the vessels. The gases and steam present will escape through an upper opening in each vessel and will pass through the pipes 23, 24, 25 and 26 into the respective steam coils of the preheater 2 heretofore referred to, thus transferring their heat to the liquor to be decomposed. By means of the valves 3, 4, 5 and 6 I regulate the amount of escaping steam and gases, in such manner that substantially no solid or liquid decomposition products escape through the pipes 23, 24, 25 and 26. These products pass from one vessel into the following and leave the last vessel through the valve 22. I regulate the flow through the valve 14 so as to keep a practically constant pressure in the container 13, and the flow from one vessel to the other so as to keep the amount of solid and liquid decomposition products in each vessel fairly constant. The pressure will progressively become reduced, the pressure in the vessel 15 being lower than in the container 13, that in the vessel 16 lower than in the vessel 15, that in the vessel 17 lower than in the vessel 16, and that in the vessel 18 lower than in the vessel 17. On account of the reduced pressure the liquor will gradually evaporate and steam will escape through the pipes 23, 24, 25 and 26 as described above. In order to prevent the liquor as far as possible from escaping in the same way, baffles 27 and 28, etc., are arranged in each vessel. The solid products escaping through the valve 22 are separated from the accompanying liquor by filtration and after drying form an excellent fuel, and may also be used as a raw material in various chemical processes for the manufacture of lignin derivatives. The calcium sulphate formed during the decomposition process will partly dissolve in the liquor and partly remain in the organic precipitate formed. If desired it may be separated therefrom by known mechanical methods.

The foregoing specific illustration of my process has been given for clearness of understanding only, and no undue limitation should be deduced therefrom, but the appended claims should be construed as broadly as permissible in view of the prior art.

What I claim as new and desire to secure by Letters Patent of the United States is:

1. The process of decomposing waste sulphite liquor which comprises continuously leading waste sulphite liquor through a container and regulating the temperature and pressure in said container so as to cause decomposition of the said liquor when passing through the said container.

2. The process of decomposing waste sulphite liquor which comprises continuously leading waste sulphite liquor through a preheater and then through a container, and regulating the temperature and pressure in said container so as to cause decomposition of the said liquor when passing through the said container.

3. The process of decomposing waste sulphite liquor which comprises continuously leading waste sulphite liquor through a preheater and then through a container, regulating the temperature and pressure in said container so as to cause decomposition of the said liquor when passing through the said container, and continuously removing the products formed during the decomposition process.

4. The process of decomposing waste sulphite liquor which comprises continuously leading waste sulphite liquor through a preheater and then through a container, regulating the temperature and pressure in said container so as to cause decomposition of the said liquor when passing through the said container, continuously removing the products formed during the decomposition process, and leading the said products through an apparatus in which the pressure is gradually reduced.

5. The process of decomposing waste sulphite liquor which comprises continuously leading waste sulphite liquor through a preheater and then through a container, regulating the temperature and pressure in said container so as to cause decomposition of the said liquor when passing through the said container, continuously removing the products formed during the decomposition process, and leading the said products through a series of vessels in each of which steam is allowed to escape through a separate opening.

6. The process of decomposing waste sulphite liquor which comprises continuously leading waste sulphite liquor through a preheater and then through a container, regulating the temperature and pressure in said container so as to cause decomposition of the said liquor when passing through the said container, continuously removing the products formed during the decomposition process, leading the said products through a series of vessels in each of which steam is allowed to escape through a separate opening, and leading the steam to the preheater, thereby transferring the heat of the steam to the liquor to be decomposed.

7. The process of decomposing waste sulphite liquor which comprises continuously leading waste sulphite liquor through a preheater in which the temperature of the said liquor is raised to a temperature between 170 and 200° C., and then leading the liquor through a container in which the pressure is kept between 17 and 20 kilograms per square centimeter, so as to cause decomposition of the said liquor when passing through the container.

8. The process of decomposing waste sulphite liquor which comprises continuously leading waste sulphite liquor through a preheater in which the temperature of the said liquor by means of indirect steam is raised to approximately 170° C., whereupon direct steam is introduced, thereby raising the temperature to approximately 190° C., then leading the said liquor into a container in which decomposition takes place, and continuously removing the products of decomposition from said container.

9. The process of decomposing waste sulphite liquor which comprises continuously leading waste sulphite liquor through a preheater in which the temperature of the said liquor by means of indirect steam is raised to approximately 170° C., whereupon direct steam is introduced, thereby raising the temperature to approximately 190° C., then leading the said liquor into a container in which decomposition takes place, continuously removing the products formed during decomposition, leading the said products through a series of vessels in which the pressure is gradually reduced, and leading the steam evolved in each chamber to the said preheater, thereby transferring the heat of the steam to the liquor to be decomposed.

10. The process of recovering useful substances in the form of solids from waste sulphite liquor, which comprises continuously leading the liquor through a preheater into a container, regulating the temperature and pressure in the said container so as to cause decomposition of the said liquor therein, continuously leading the products formed during the decomposition step into a separator in which a lower pressure is maintained than in the container, continuously leading the hot gases from the separator to the preheater and employing the same in the preheating step of the process, and continuously removing the solid decomposition products from the separator.

11. The process of recovering useful substances in the form of solids from waste sulphite liquor, which comprises continuously leading the liquor through a preheater into a container, regulating the temperature and pressure in the said container so as to cause decomposition of the said liquor therein, continuously leading the products formed during the decomposition step into a separator comprising a series of vessels in which progressively lower pressures are maintained than in the container, continuously leading the hot gases from each separator vessel to the preheater and employing the same in the preheating step of the process, and continuously removing the solid decomposition products from the last vessel of the separator series.

Signed at Christiania, Norway, this 8th day of April, 1920.

KRISTOFFER MÖRCH.